Patented Dec. 15, 1953

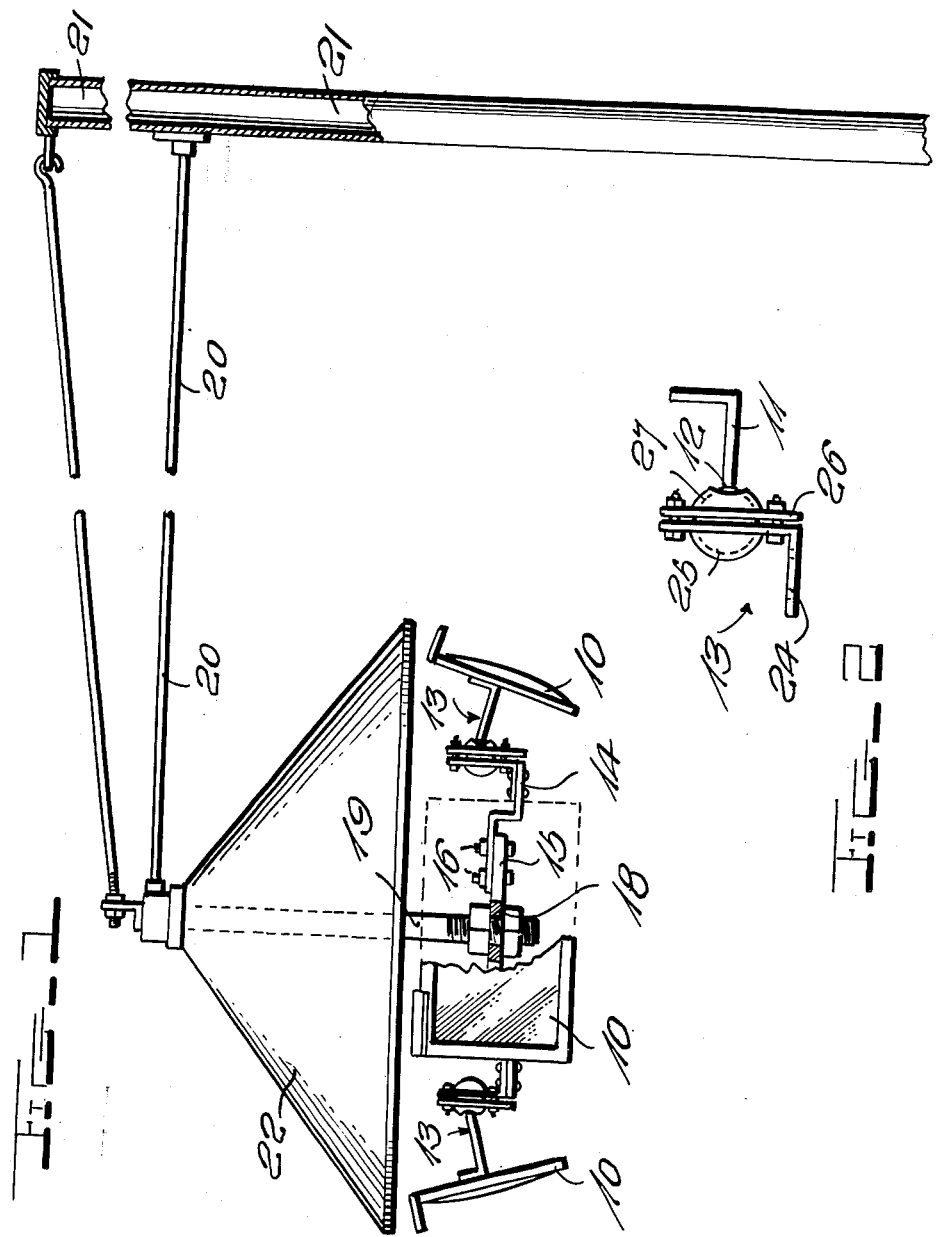

2,662,448

UNITED STATES PATENT OFFICE 2,662,448

TRAFFIC MIRROR DEVICE

Georges A. Couture, Quebec City, Quebec, Canada

Application November 17, 1950, Serial No. 196,207
Claims priority, application Canada November 17, 1949

1 Claim. (Cl. 88—78)

My invention relates to a traffic mirror device.

The object of the invention is to provide a mirror device to be placed at the intersection of two or more streets or roads whereby the driver of a motor vehicle approaching an intersection will be able to see in the mirror the image of any other vehicle or vehicles approaching the same intersection on a transverse street.

Another object of the invention is that the mirror or mirrors are adjustable in three planes, best to serve the purpose intended.

In the drawings, wherein like numerals of reference indicate corresponding parts in the various figures, Figure 1 is a side view of a device according to the invention; and, Figure 2 is a side view of the mirror-supporting bracket.

Referring now by numerals to the drawing, 10 indicates the mirrors—four in the form shown. Secured to the back of the mirror is a bracket 11, terminating in a ball or spherical member 12. The spherical member is adapted to be received and held in a suitable bracket 13 so as to be adjustable or rotatable therein. The ball and bracket in effect provide a ball and socket joint.

The bracket is supported and secured to a member 14 which includes a horizontal leg 15 adapted to be adjustably secured lengthwise, as with bolts 16, to one leg of a substantially cross-shaped member 18.

The member 18 is adjustably secured to the lower end of a rod or tube 19 depending from one end of a tube or rod 20 extending horizontally from an upright or standard 21.

Preferably, as shown, a hood or apron 22 is suspended from the member 20 to extend beyond or cover the mirrors 10 and substantially shield them from rain or snow.

The bracket 13 may be formed as shown in Figure 2. As seen, it includes an L-shaped member 24 having one leg adapted to be secured to the leg member 14 of the support 17. The other leg member is formed with a substantially semi-spherical hollow portion 25 rotatably to receive substantially one-half of the ball 12 of the bracket 11. It also includes a complementary member 26 formed with a spherical wall 27 formed with an opening 28 through which the ball 12 in part projects. Both members 24 and 26 are formed with co-operating flanges which may be bolted together in effect to provide a socket for the ball member 12.

Preferably, the flanges are so related to the respective spherical walls that when the ball is in the socket, the flanges will be spaced slightly apart. Thus, the pressure bearing upon the ball 12 can be varied effectively to lock the ball in the desired position or to release the ball for movement, and therefore adjustment of the mirror supported by the bracket 11 to which the ball is fixed.

The invention is capable of considerable modification and such changes thereto as come within the scope of the appended claim is deemed to be a part of the present invention.

I claim:

A mirror for viewing traffic at street intersections comprising a standard, an arm fixedly connected at one end to and extending substantially perpendicular from an upper portion of said standard, an eye mounted on the upper end portion of said standard above said arm, a second arm having a hook shaped end inserted through said eye for being pivotally connected thereto, a rod detachably connected at one end to the opposite end of said second arm, a conical hood having a central opening with said rod extending therethrough and the apex of said hood being connected to said first mentioned arm, a cross-shaped member detachably mounted on the lower end of said rod and extending substantially perpendicular therefrom, a plurality of legs each adjustably mounted for longitudinal movement on one arm of said cross-shaped member and extending substantially in a horizontal position, a plurality of brackets each mounted on the outer end of one of said legs and having a vertically extending portion, each vertical portion of said brackets having a semi-spherical recess provided in the outer face thereof, a plurality of plates each having a semi-spherical recess provided in a face thereof and being adjustably connected to one of said leg vertical portions with the respective recesses facing one another, said plates each having an opening provided through their respective recess, a plurality of balls each mounted in the recess between a plate and a bracket, a plurality of support arms each extending from one of said balls through a plate opening, and a plurality of elongated mirrors each mounted on an end of one of said support arms and positioned for viewing traffic from therebelow.

GEORGES A. COUTURE.

References Cited in the file of this patent

UNITED STATES PATENTS

| Number | Name | Date |
|---|---|---|
| 1,515,939 | Edwards | Nov. 18, 1924 |
| 1,533,742 | Kilpatrick | Apr. 14, 1925 |
| 1,651,301 | Stewart et al. | Nov. 29, 1927 |
| 2,252,558 | Dodson | Aug. 12, 1941 |

FOREIGN PATENTS

| Number | Country | Date |
|---|---|---|
| 23,799 | Great Britain | of 1911 |